UNITED STATES PATENT OFFICE.

EDWARD MARK SLOCUM, OF MEDAN, SUMATRA, DUTCH EAST INDIES, ASSIGNOR TO GENERAL RUBBER COMPANY, A CORPORATION OF NEW JERSEY.

RUBBER COAGULUM OR SIMILAR MATERIAL AND PROCESS FOR PREPARATION OF THE SAME FROM LATEX FOR VULCANIZATION.

1,259,793. Specification of Letters Patent. Patented Mar. 19, 1918.

No Drawing. Application filed January 8, 1917. Serial No. 141,288.

*To all whom it may concern:*

Be it known that I, EDWARD MARK SLOCUM, a citizen of the United States, residing at Medan, Province of Deli, Sumatra, Dutch East Indies, have invented certain new and useful Improvements in Rubber Coagula or Similar Materials and Processes for Preparation of the Same from Latex for Vulcanization, of which the following is a full, clear, and exact description.

This invention relates to rubber coagulum or similar material and to a process for the preparation of the same from latex for vulcanization. It is more particularly directed to a precipitated latex or coagulum conserving therewithin nitrogenous and other constituents normally present in the latex, and to a process for producing the same.

Nitrogenous and other materials such as proteins, resins, sugars, gums, etc., held in solution, suspension, or other form in the latex and which also occur in the coagulum under the ordinary conditions of coagulation, have heretofore exuded from the coagulum as formed producing a slime upon the surface thereof. Such exudation causes a change in the constitution of the rubber and the resulting slime offers a field for the growth of molds, yeast, fungi, bacteria, vermin and the larvæ of insects and interferes with the drying of the coagulum by forming a coating over its surface.

Washing the coagulum for removal of the slime, as heretofore practised, is objectionable due to the loss from the rubber of the nitrogenous and other materials mentioned which represent valuable constituents thereof, since when disseminated throughout the mass, they aid in vulcanization, acting as catalysts, and cause a general improvement in the physical properties of the cured rubber.

One of my objects has been accordingly to provide a rubber coagulum from latex for vulcanization adapted to dry rapidly, free from slime formation and hence presenting no field for plant or animal growth, and including nitrogenous and other materials therein thoroughly disseminated throughout the mass. Another object has been to devise a simple, efficient process for the production of such coagulum.

In producing the coagulum, the latex is subjected to a reactive substance capable of forming and disseminating through the solution, suspension, emulsion or other form of nitrogenous material therein, a substance or substances adapted to prevent the formation of slime on the finished coagulum. The preferred reactive agent which I employ is beta-naphthol in solution, preferably containing approximately 0.2% of beta-naphthol, based on the weight of the latex. Upon the addition of this material to the latex, an insoluble material is formed which appears to be a compound or some other association of nitrogenous material and beta-naphthol. Sulfur or other vulcanizing agent may be added to the latex prior to the treatment indicated; or may be added subsequent to the treatment; or may be added at any time prior to vulcanization.

It has been found that the coagulum produced by treatment of latex of *Hevea* in the above manner possesses excellent characteristics in that it is free from slime, and the nitrogenous constituents are thoroughly disseminated throughout the mass. A general improvement of the physical characteristics of the coagulum has also been observed. Such coagulum has also been found to dry rapidly and to offer substantially no attraction to bacteria, vermin, etc.

As an additional precaution against the formation of molds and the establishment of putrefactive fermentation in the mass, the coagulum obtained by the addition of beta-naphthol to the latex as above set forth, may be given a surface treatment of an alcoholic solution of beta-naphthol. Coagulum treated in this manner has been found to be substantially immune from attack of bacteria, etc.

It will be noted that other materials than beta-naphthol may be used in carrying out the process outlined. Beta-naphthol is an example of a group of substances which are adapted for such use. This group includes mono- and poly-hydroxy benzenoids of polycyclic structure, and ethers, salts, esters, polymers, and other compounds of these substances.

Having thus described my invention what I claim and desire to protect by Letters Patent is:

1. A mass of rubber or similar material including nitrogenous matter or the like and a polycyclic member of the benzene series.

2. A mass of rubber or similar material including nitrogenous matter or the like and a hydroxy derivative of a polycyclic member of the benzene series.

3. A mass of rubber or similar material including nitrogenous matter or the like and a hydroxy naphthalene disseminated therethrough.

4. A mass of rubber or similar material including nitrogenous matter or the like and a naphthol.

5. A mass of rubber or similar material including nitrogenous matter or the like and beta-naphthol disseminated therethrough.

6. The process of treating latex or similar material which comprises subjecting the mass to a hydroxy derivative of a polycyclic member of the benzene series, forming a substance adapted to prevent slime formation, and combining a vulcanizing agent with the mass.

7. The process of treating latex or similar material which comprises subjecting the mass to a hydroxy naphthalene, forming a substance adapted to prevent slime formation, and combining a vulcanizing agent with the mass.

8. The process of treating latex or similar material which comprises subjecting the mass to a hydroxy derivative of a polycyclic member of the benzene series, forming in the interior of the mass a substance adapted to prevent slime formation, and combining a vulcanizing agent with the mass.

9. The process of treating latex or similar material which comprises subjecting the mass to a hydroxy naphthalene, forming and disseminating throughout the mass a substance adapted to prevent slime formation, and combining a vulcanizing agent with the mass.

10. The process of treating latex or similar material which comprises subjecting the mass to beta-naphthol, forming and disseminating throughout the mass an insoluble substance comprising nitrogenous matter and said beta-naphthol, and combining a vulcanizing agent with the mass.

11. The process of treating latex or similar material which comprises subjecting the mass to a hydroxy derivative of a polycyclic member of the benzene series, and forming a substance adapted to prevent slime formation.

12. The process of treating latex or similar material which comprises subjecting the mass to a hydroxy naphthalene, and forming a substance adapted to prevent slime formation.

13. The process of treating latex or similar material which comprises subjecting the mass to a hydroxy derivative of a polycyclic member of the benzene series, and forming in the interior of the mass a substance adapted to prevent slime formation.

14. The process of treating latex or similar material which comprises subjecting the mass to a hydroxy naphthalene, and forming and disseminating throughout the mass a substance adapted to prevent slime formation.

15. The process of treating latex or similar material which comprises subjecting the mass to beta-naphthol, and forming and disseminating throughout the mass an insoluble substance comprising nitrogenous matter and said beta-naphthol.

16. The process of treating latex or similar material which comprises treating the mass with a polycyclic member of the benzene series and conserving therewithin substantially all of the solid constituents of the latex.

17. The process of treating latex or similar material which comprises treating the mass with a hydroxy naphthalene and conserving therewithin substantially all of the solid constituents of the latex.

18. The process of treating latex or similar material which comprises treating the mass with a polycyclic member of the benzene series, conserving therewithin substantially all of the solid constituents of the latex and adding a vulcanizing agent thereto.

19. The process of treating latex or similar material which comprises treating the mass with hydroxy naphthalene, conserving therewithin substantially all of the solid constituents of the latex and adding a vulcanizing agent thereto.

20. A mass of rubber or similar material derived from latex treated with a polycyclic member of the benzene series.

21. A mass of rubber or similar material derived from latex treated with a hydroxy derivative of a polycyclic member of the benzene series.

22. A mass of rubber or similar material derived from latex treated with a hydroxy naphthalene.

23. A mass of rubber or similar material derived from latex treated with a naphthol.

24. A mass of rubber or similar material treated with a polycyclic member of the benzene series and conserving therewithin substantially all of the solid constituents of the latex.

25. A mass of rubber or similar material treated with a hydroxy naphthalene conserving therewithin substantially all of the solid constituents of the latex.

26. A mass of rubber or similar material treated with a naphthol and conserving therewithin substantially all of the solid constituents of the latex.

Signed at New York, county of New York, State of New York, this 5 day of January, 1917.

EDWARD MARK SLOCUM.